US007798183B2

(12) United States Patent
Cegelski et al.

(10) Patent No.: US 7,798,183 B2
(45) Date of Patent: Sep. 21, 2010

(54) INTEGRATED COMPRESSOR-TIRE SEALANT INJECTION DEVICE WITH LARGE MOUTH SEALANT CONTAINER

(75) Inventors: James Cegelski, Grover Beach, CA (US); Scott Noble Hickman, Ventura, CA (US)

(73) Assignee: Illinois Tool Works Inc., Glenview, IL (US)

( * ) Notice: Subject to any disclaimer, the term of this patent is extended or adjusted under 35 U.S.C. 154(b) by 877 days.

(21) Appl. No.: 11/588,514

(22) Filed: Oct. 26, 2006

(65) Prior Publication Data

US 2008/0098855 A1 May 1, 2008

(51) Int. Cl.
*B65B 31/00* (2006.01)
*B65B 1/04* (2006.01)
(52) U.S. Cl. .................. 141/38; 141/98; 152/415
(58) Field of Classification Search ............ 141/38, 141/41, 98; 152/415
See application file for complete search history.

(56) References Cited

U.S. PATENT DOCUMENTS

| 3,515,181 | A | * | 6/1970 | Sperberg | 141/38 |
|---|---|---|---|---|---|
| 4,765,367 | A | * | 8/1988 | Scott | 141/38 |
| 5,070,917 | A | * | 12/1991 | Ferris et al. | 141/38 |
| 5,403,417 | A | * | 4/1995 | Dudley et al. | 141/38 |
| 5,908,145 | A | | 6/1999 | Jaksa | 222/394 |
| 6,176,285 | B1 | * | 1/2001 | Gerresheim et al. | 152/509 |
| 6,283,172 | B1 | * | 9/2001 | Thurner | 141/38 |
| 6,345,650 | B1 | | 2/2002 | Paasch et al. | 141/5 |
| 6,412,524 | B1 | | 7/2002 | Fogal, Sr. | |
| 6,736,170 | B2 | | 5/2004 | Eriksen et al. | 141/38 |
| 6,789,581 | B2 | | 9/2004 | Cowan et al. | |
| 6,889,723 | B2 | * | 5/2005 | Gerresheim et al. | 141/38 |
| 6,964,284 | B2 | | 11/2005 | Eckhardt | 141/38 |
| 6,968,869 | B2 | | 11/2005 | Eckhardt | 141/38 |
| 7,021,348 | B2 | * | 4/2006 | Eriksen et al. | 141/38 |
| 7,178,564 | B2 | * | 2/2007 | Kojima et al. | 141/38 |
| 7,389,800 | B2 | * | 6/2008 | Hickman et al. | 141/38 |
| 2006/0086403 | A1 | * | 4/2006 | Kant et al. | 141/38 |
| 2006/0217662 | A1 | | 9/2006 | Hickman et al. | |

FOREIGN PATENT DOCUMENTS

| WO | WO 99/14031 | 3/1999 |
|---|---|---|
| WO | WO 03/041949 | 5/2003 |
| WO | WO 2004/041649 | 5/2004 |
| WO | WO2005/085028 | * 9/2005 |

OTHER PUBLICATIONS

PCT/US07/22337, International Search Report, dated Apr. 15, 2008.
PCT/US07/22337, Written Opinion, dated Apr. 15, 2008.

* cited by examiner

*Primary Examiner*—Gregory L Huson
*Assistant Examiner*—Nicolas A Arnett
(74) *Attorney, Agent, or Firm*—DLA Piper LLP (US)

(57) ABSTRACT

An integrated compressor-tire sealant injection device with a sealant container and a compressor is provided. The integrated compressor-tire sealant injection device has a compressor unit that has a compressor and a connector to a bottle of sealant integrated into the compressor unit so that a bottle of sealant is connectable to the device to inflate a tire wherein the connector has first and second ball valves.

17 Claims, 11 Drawing Sheets

INTEGRATED COMPRESSOR-TIRE SEALANT INJECTION DEVICE WITH LARGE MOUTH SEALANT CONTAINER

FIELD OF THE INVENTION

This invention relates to a tire repair and inflation device. It is intended to allow fast, simple repair and inflation of punctured pneumatic tires. It can be used as a compressor, dispensing air only. It can be used to dispense sealant and air. It has a replaceable sealant container.

BACKGROUND OF THE INVENTION

The fixing of a flat tire for most automobiles involves several steps including:
 1. Pulling safely to the side of the road.
 2. Locating the tools.
 3. Raising the vehicle.
 4. Replacing the punctured wheel assembly with a spare wheel assembly.
 5. Lowering the vehicle.
 6. Stowing the punctured wheel assembly.

For the average motorist this task can be daunting at best. It needlessly exposes the motorist to inherent roadside dangers for long time periods. Over the past several years, the task of emergency tire repair has been addressed with a myriad of technologies. The traditional solution to an emergency flat tire repair has been the use of a compact or full size spare tires or the use of a towing service. Alternative solutions to addressing the problem associated with punctured tires include: (1) aerosol sealants to seal the hole/puncture and re-inflate the tire and (2) run-flat tires. All of these solutions are sub-optimal and many introduce more problems and higher costs.

Spare tires for their part are bulky, heavy, expensive, difficult to access and difficult to install. One solution which addresses many of the shortcomings of a spare tire, is aerosol sealant dispensers which combine a chemical fluid to be dispensed with a propellant. These are usually contained in a can or other type of container. A tube is attached between the can and a tire via a tire valve stem. The fluid is propelled through the valve stem into the tire. When the fluid flows through a tire puncture, it hardens with exposure to air. This forms a temporary repair of the tire. In theory, this method helps to eliminate some of the problems associated with tire repair. In fact, this method creates a more hazardous driving situation for the motorist. There is not enough propellant in the aerosol sealant container to properly and safely inflate the tire. Making this matter worse is the fact that the aerosol container becomes potentially explosive when stored in a vehicle operating in a climate where inside car temperatures can exceed 128 F. This can result in a very dangerous situation in which a partially inflated tire generates excessive heat due to repeated over-flexing which can cause the control of the vehicle to be compromised. A partially inflated tire will also cause premature tire failure.

A two-part system for repairing tires has been developed. The two parts include both a fluid sealant and a compressed air source. The compressed air source allows proper and safe inflation of the tire. It allows tire repair without raising the car. It allows safe handling and control of the vehicle due to properly inflated tires. Potential advantages of this two part system have not been realized for various reasons. Most solutions require air from the compressor to be forced into the sealant container through an intake. This results in sealant being forced out of the container and into the tire through an exhaust. This is very similar to the aerosol sealant described above except that compressed air is used to pressurize the sealant container. The many systems tend to be complicated and potentially unreliable. Most sealant delivery systems use a bottle to contain the sealant. The narrow opening of the bottle restricts the orientation of the sealant delivery system. The bottle must usually be oriented with the opening below the fluid. The bottle cannot be oriented on its side, i.e., horizontally. If oriented horizontally, roughly only half of the sealant will be dispensed.

Another disadvantage is hardening of the chemical sealant after use. While dispensing, sealant can contact outlet surfaces. These surfaces result in receiving a layer of hardened sealant. These parts of the dispensing device must be replaced. This is inconvenient for the user. Replaceable parts increase design complexity. This results in increased costs and lowered reliability. This is at best inconvenient. At worst, it can result in a user's vehicle being unrepaired.

One two part system uses a container of fluid tire sealant with an intake and an exhaust. A compressed air source forces compressed air through an intake into the sealant container. The resulting pressurized container exhausts sealant through an exhaust into the punctured tire. Potential advantages of this design are not realized because of the requirement for fluid container orientation. The container can be oriented so that the outlet is above the fluid. The device will simply pump air in this orientation. After use, the outlet of the device becomes contaminated with hardened sealant. If oriented horizontally, only roughly half of the sealant can be dispensed.

Another variation of this pressurized container method exists. In this method, the compressed air does not actually enter the sealant container. The compressed air fills and pressurizes a cavity around the sealant container. The sealant container has a movable piston at one end and the pressurized cavity causes this piston to push against the sealant in the container and the resulting pressure forces sealant through an exhaust into a punctured tire. A cap covering both the sealant container and pressurized cavity serves as a valve. This cap-valve allows the system to operate simply as a compressor passing air. This cap-valve alternately allows pressurized sealant to be injected into a punctured tire. This method seems to have an advantage of orientation independent operation, but this advantage is not realized. The combination of sealant container, cavity, and cap-valve increases complexity. This complexity increases the cost of the device. This complexity also reduces the system reliability. The portion of the cap-valve that comes into contact with sealant must be replaced. Sealant will harden when exposed to air or moisture. This portion of the cap-valve becomes useless due to hardened sealant.

Another device has a container of sealant fluid that is inside of a pressurized chamber. During use, the chamber is pressurized. This crushes the sealant container forcing sealant through an outlet. The advantage of orientation independent operation is not realized in this design because hardened sealant on the outlet parts requires replacement of these parts and the crushing of the container requires a flexible container. The container must be replaced after use and sometimes does not crush completely so that all of the sealant fluid is not delivered to the outlet and fluid that remains in the container is wasted. During replacement, this fluid can contact the user's skin. Depending on the chemical composition of the fluid, this may be hazardous.

An integrated compressor and sealant dispensing device also exist. This device includes a valve that switches the compressed air between air and sealant, and air only. This device uses a bottle of sealant with a metal or polymer seal instead of a cap. This device has the apparent advantage of ease of use. It's advantages are not realized because the valve that switches between sealant and air must be replaced after injecting sealant. This is very inconvenient, complicated, and adds cost. The sealant container uses a small mouth bottle which restricts its allowed orientation. The container's metal or polymer seal requires puncturing before use and the device uses a fairly complicated piston puncturing device. In addition, loose fragments of the punctured seal can be passed into the tire's valve core and this can result in the tire valve not functioning correctly so that air may leak from the tire while driving which negates any repair that may have been attempted.

A typical sealant injection unit exists. This unit provides a standing surface on its side which seems to allow a preferred sealant container orientation. However, this is not realized because the sealant container uses a narrow mouth so that the container must be oriented above the injection unit. The standing surface is on the bottom "side" of the injection unit. The container in this unit uses a metal or polymer seal and the seal must be punctured before injecting into a tire so that fragments of the punctured seal can impair the tire valve function which causes air to leak from the tire while driving after the sealant is injected which negates any repair that may have been attempted. In addition, the sealant container must be connected just before injecting sealant in order to puncture the seal which is inconvenient for the user.

Another sealant injection system exists. This system integrates a sealant container with a compressed air source which has the apparent advantage of allowing the user one button flat repair. This advantage is not realized for several reasons. First, this device requires the user to connect the sealant container just before use (which is inconvenient for the user) and the sealant container must be pneumatically connected to the compressed air source. Second, this device requires the user to screw the container into a special receptacle and the sealant container is a small mouthed bottle. After attaching, the container is oriented so the opening is at the bottom and screwing the bottle onto the special receptacle punctures the seal so that loose fragments of the punctured seal can impair the tire valve function which may cause air to leak from the tire while driving after the sealant is injected which negates any repair that may have been attempted.

A device for dispensing sealant is also known wherein the outlet is at the base of the sealant container and the device must be oriented vertically for the sealant to dispense. The base is the smallest face of the container so that orienting the device on the base causes it to be unstable and can fall over while sealant is dispensing. In addition, if the user does not re-orient it, all the sealant will not dispense so that sealant is wasted.

Another sealant dispensing device is described that is a cylinder with check valves at each end. The outlet of the device is shown in the center of the circular end of the cylinder so that the device must not be tipped so that the outlet is above the inlet. If the outlet is higher than the inlet, only air will pass through and the sealant will not be forced out. Therefore, this device must be oriented with the outlet below the inlet and must be tipped at an angle. In addition, sealant must remain below the air while dispensing.

Thus, it is desirable to provide an integrated compressor device and sealant container that overcomes the limitations of the above typical systems and devices and it is to this end that the present invention is directed.

SUMMARY OF THE INVENTION

An integrated compressor and sealant container device is provided. The device fixes a tire puncture and inflates a tire via an integrated sealant container and compressed air source. The sealant container has a wide mouth that allows the outlet to be below most of the sealant fluid when the container is oriented on its side. The outlet is also below the sealant fluid when the jar is oriented vertically so that the outlet opening is below the sealant. Therefore use of a wide mouth jar allows more dispensing orientations than a narrow mouth bottle. The container has an air intake on one end and an outlet that is located as low as possible relative to the fluid being dispensed and oriented at the base of the container. The sealant container can be used with any compressor. The sealant container includes a hose and the hose has a unique valve which attaches to the tire valve to allow sealant and air to flow into the tire, but when disconnected/unscrewed from the tire, the valve closes and creates an air-tight seal. After use, the container and hose are simply discarded or recycled and a new sealant container may be simply inserted into the housing of the device. The device also permits compressed air only to be directed into the tire using a valve. The valve never contacts sealant (so it does not become clogged), never needs replacement and changes the system between "sealant and air" and "air only" modes. The sealant container may include check valves to seal the container. The sealant container does not use a metal or polymer seal so that no loose punctured seal fragments will compromise the user's tire valve and the tire valve will not leak from loose punctured seal fragments clogging it.

The sealant container can be used separately from the integrated compressor housing since it can be attached to any compressed air source. The sealant container may include a pressure relief valve that allows any air source to be used to dispense sealant. The pressure relief valve can take a variety of forms which one of the simplest being a so-called sleeve valve. The sleeve valve is formed by a small hole located in the side wall of the inlet with a rubber sleeve slipped over the inlet and covering the hole. Then, the hole diameter and sleeve dimensions are chosen so that at a critical pressure air will pass through the hole under the sleeve limiting the maximum pressure inside of the sealant container.

Thus, in accordance with the invention, a device for tire repair and/or inflation is provided. The device has a compressor unit that has a compressor and a connector to a bottle of sealant integrated into the compressor unit so that a bottle of sealant is connectable to the device to inflate a tire.

DETAILED DESCRIPTION OF AN EMBODIMENT

The invention is particularly applicable to an integrated compressor device and storage container that may be used to inflate and/or repair an automobile tire and it is in this context that the invention will be described. It will be appreciated, however, that the device and storage container in accordance with the invention has greater utility since it may be used to inflate and/or repair any type of inflatable member, such as a bicycle tire, a motorcycle tire or any other type of inflatable member that a person might want to inflate and/or repair.

Figure 1:
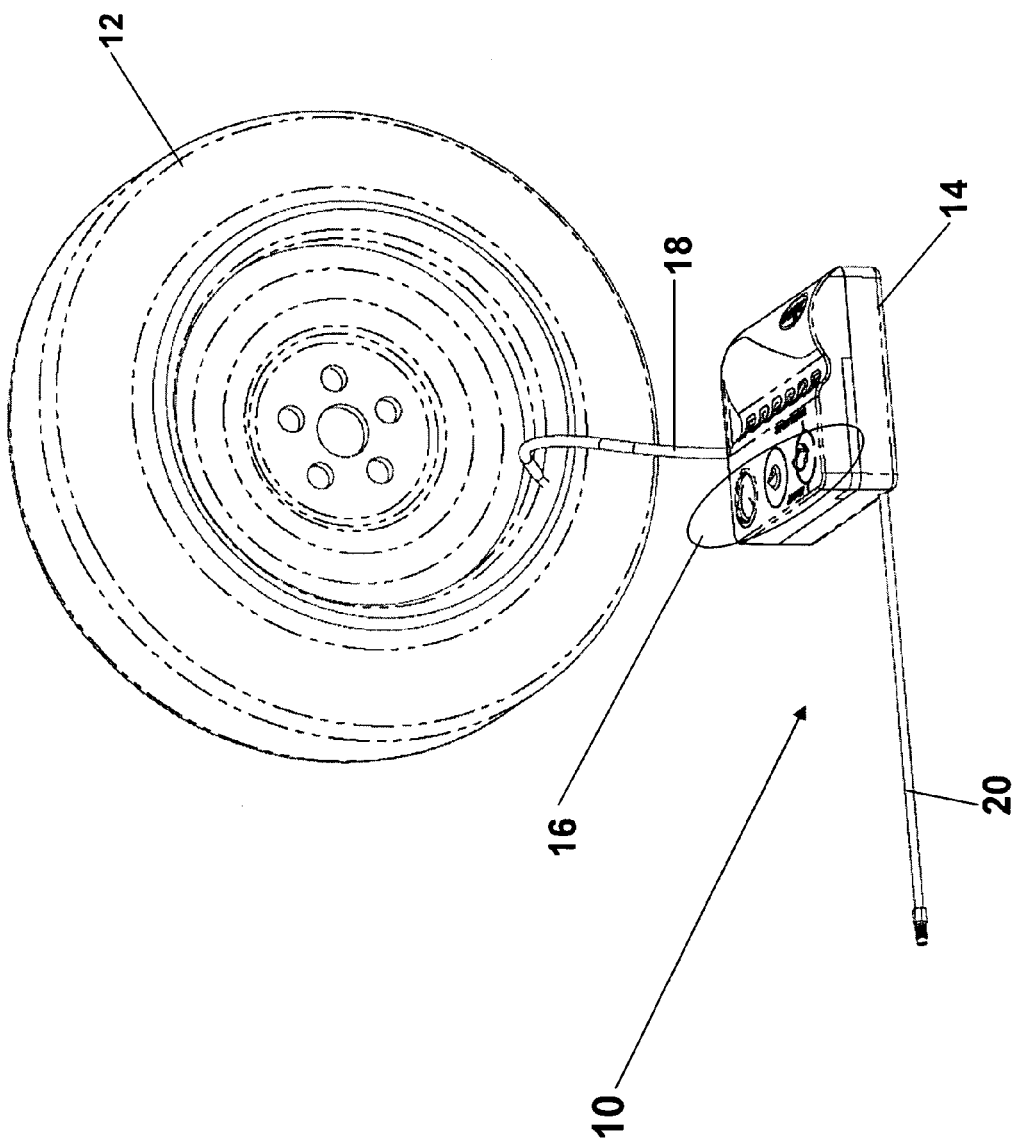
FIGS. 1 and 2 illustrate an integrated compressor being used to seal and inflate an object, such as an automobile tire.
Figure 2:
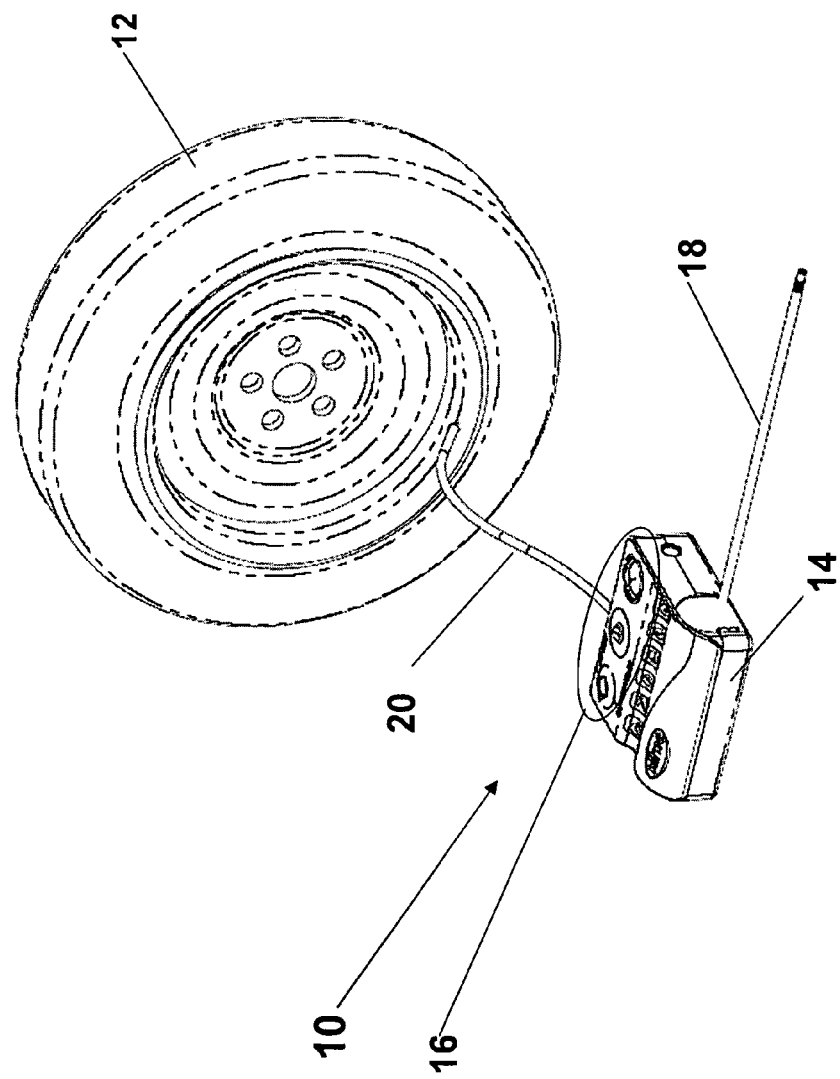

FIGS. 1 and 2 illustrate an integrated compressor device 10 in accordance with the invention being used to seal and/or inflate an object 12, such as an automobile tire. The device 10 may include a housing 14 that houses an gas compressor and a sealant container that contains a sealant that may be propelled into the inflatable object 12 in order to repair a puncture in the inflatable object 12. The preferred gas compressor is a small 12V DC gear-driven, piston-type compressor. The device may also use 12V DC motor direct drive piston-type compressors, 120V AC powered compressors, and diesel motor driven truck air compressors. The integrated pressure relief valve of the device 10 allows any compressor to dispense the sealant without causing danger or inconvenience to the user. The device may further include a set of controls 16 on the housing that control the operation of the device as described in more detail below. In the embodiment shown in FIGS. 1 and 2, the device may have a first hose 18 and a second hose 20 wherein the first hose 18 may inject compressed gas, such as air, and the sealant in the sealant container (shown in FIG. 5) into the inflatable object in order to repair the inflatable object and re-inflate the inflatable object. The second hose 20 may inject the compressed gas into the inflatable object to re-inflate the inflatable object. Thus, the device 10 may be used in a mode of operation in which air and sealant are injected into the inflatable object as shown in FIG. 1 or a mode of operation in which compressed air from the compressor is injected into the inflatable object as shown in FIG. 2. The device is powered from a 12V DC power source, preferably a car accessory power adapter or 12V lead acid battery and receptacle adapter. Other power sources may include 120 V AC, or other compressed air generators or storage tanks. The device 10 may use any type of sealant. Preferably, the device 10 may use the Slime brand sealant commercially sold by Accessories Marketing, Inc. (www.slime.com) The first hose 18, which is the sealant and air hose, and the second hose 20 may include a screw valve located at the end of the hose that connects to a tire. The screw valve of the first hose 18 opens when attached to a tire and closes when disconnected from the tire to prevent spray and dripping of the sealant fluid.

Figure 3:
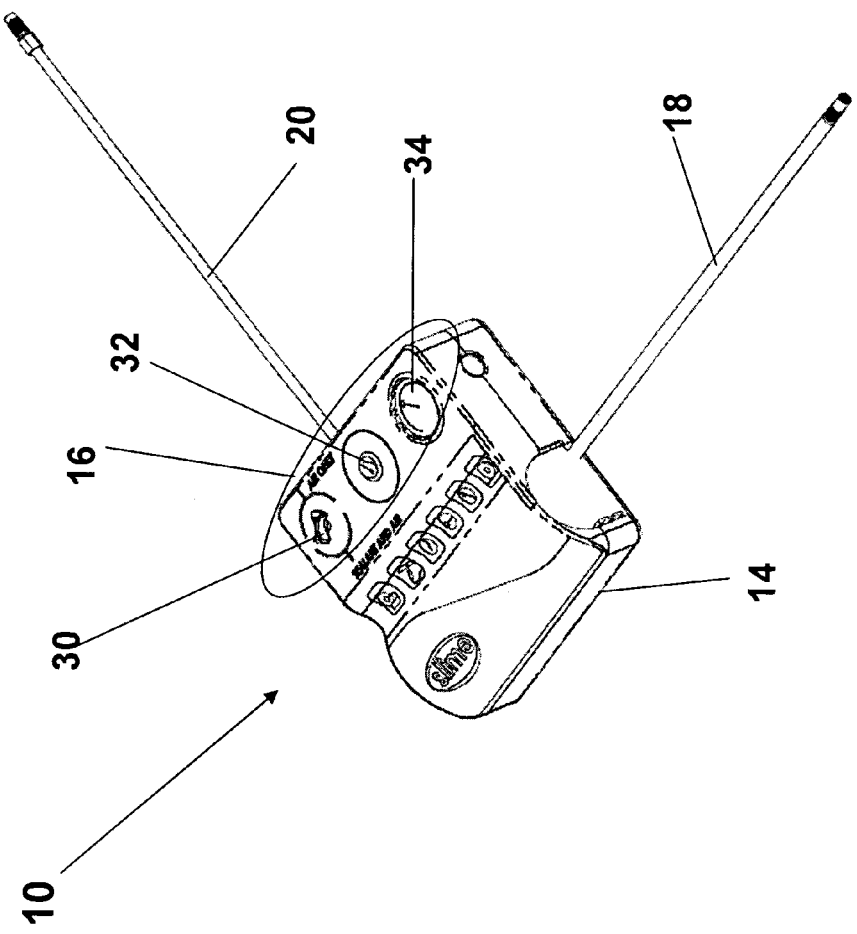
FIG. 3 illustrates more details of the integrated compressor.

FIG. 3 illustrates more details of the integrated compressor device 10 in accordance with the invention. In this figure, an example of the set of controls 16 is shown in which the set of controls may further comprise a mode switch 30 in which the mode of operation of the device may be switched between the air only operation and the air and sealant mode of operation so that the device 10 may be used to inflate an inflatable object and/or repair and inflate a damaged inflatable object. The set of controls may also include an on/off switch 32, shown as a rocker switch in an exemplary embodiment, and a pressure gauge 34 that shows the pressure of the inflatable object so that the user of the device can inflate the inflatable object to the proper pressure since over-inflation and/or under-inflation are both detrimental to the inflatable object.

Figure 4:
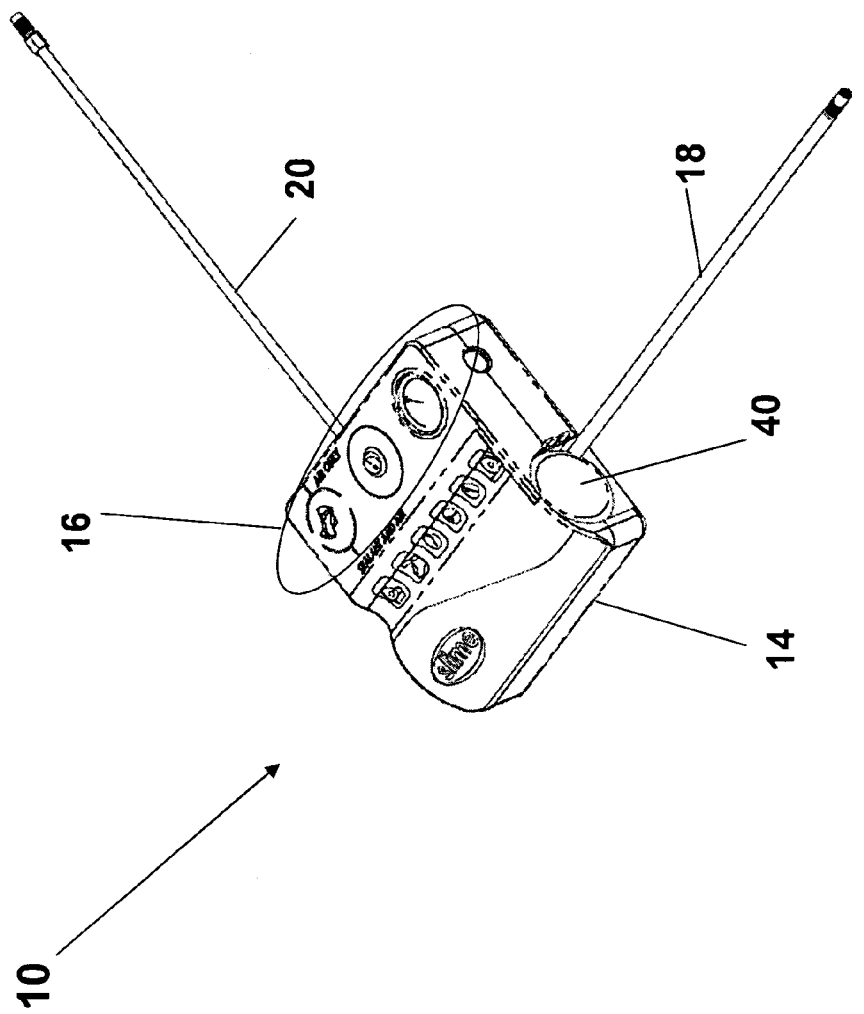
FIG. 4 illustrates the integrated compressor with the sealant container cover removed.
Figure 5:
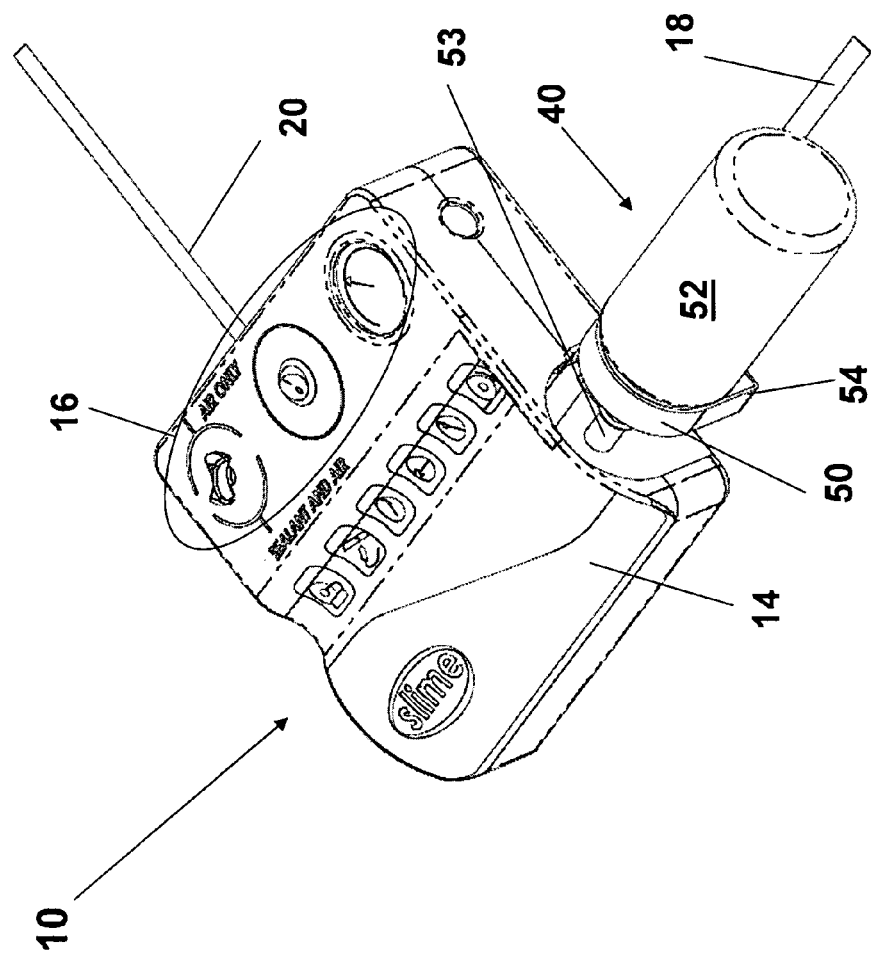
FIG. 5 illustrates the integrated compressor with a sealant container being inserted into the integrated compressor.
Figure 6:
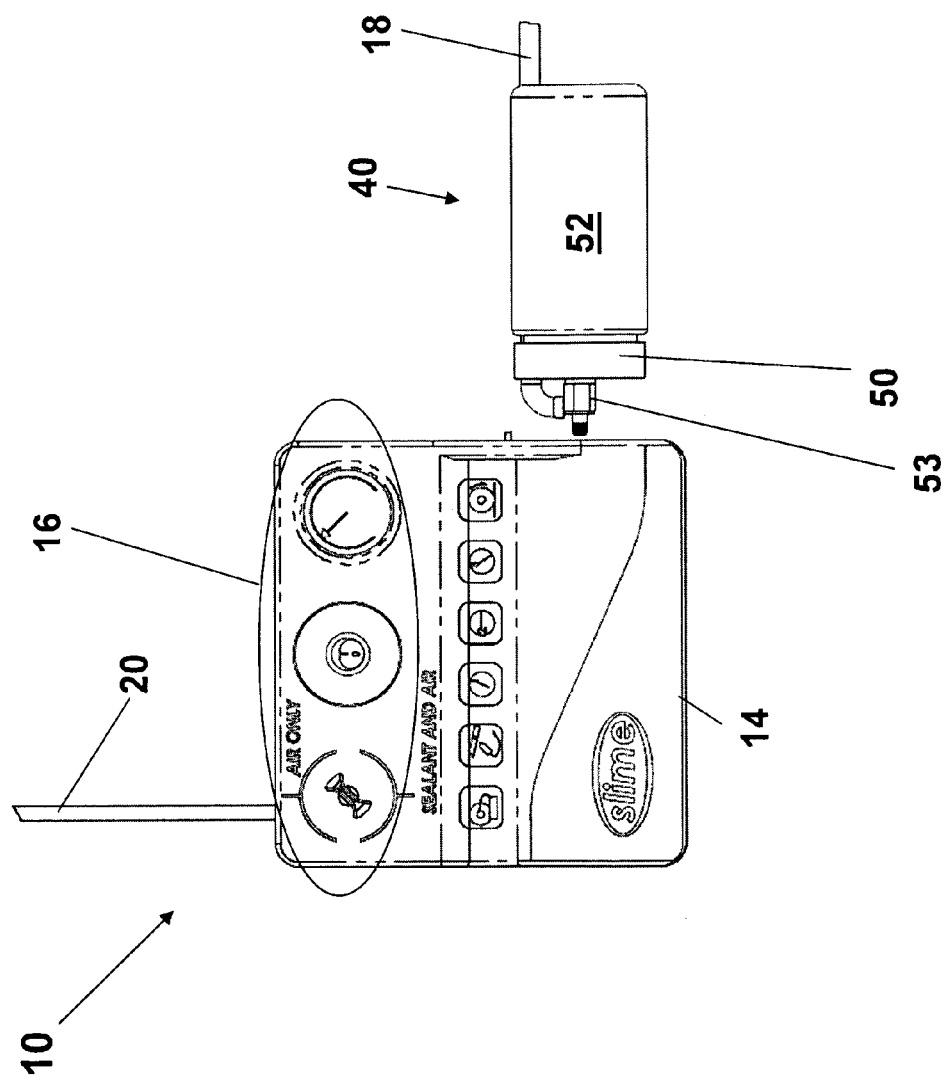
FIG. 6 illustrates more details of the integrated compressor with a sealant container.

FIG. 4 illustrates the integrated compressor device 10 with a sealant container cover removed. In particular, a sealant container 40 is visible is FIG. 4. The sealant container is preferably in a horizontal position as shown in FIG. 4 which is its most stable orientation and ensures that the sealant is delivered into the inflatable object through the hose 18. Alternatively, the container may be oriented in a vertical position as well if it is used outside of the housing. As shown in FIG. 5, a sealant bottle 52 has a wide mouth that allows the outlet to be below most of the sealant fluid when the container is oriented on its side. The outlet is also below the sealant fluid when the jar is oriented vertically so that the outlet opening is below the sealant. Therefore use of a wide mouth jar allows more dispensing orientations than a narrow mouth bottle. As shown in FIGS. 5 and 6, the sealant container 40 may preferably include the first hose 18 that is coupled to an assembly 50. The assembly 50 also has a connector (not shown in this figure) that couples the sealant bottle 52 to the assembly so that the sealant may be injected into the tire with the compressor air and a connector/valve 53 that couples the sealant container 40 to the device 10 as described in more detail below. The assembly 50 may further include a leg portion 54 that supports the sealant bottle at the proper height to maintain the horizontal position of the sealant bottle 52.

Figure 7:
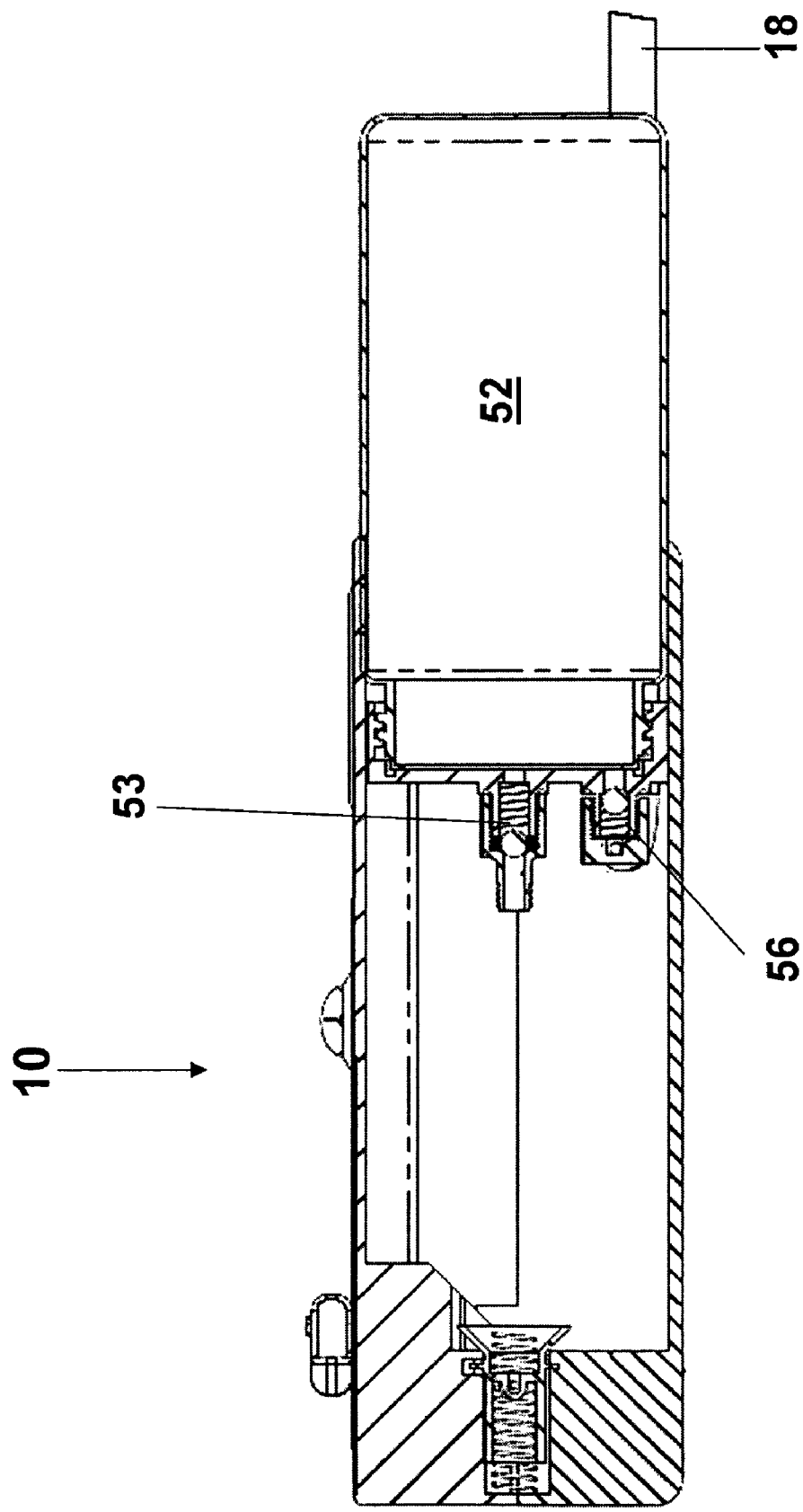
FIG. 7 illustrates a cut-away side view of the integrated compressor showing the connection of the sealant container to the integrated compressor.
Figure 8:
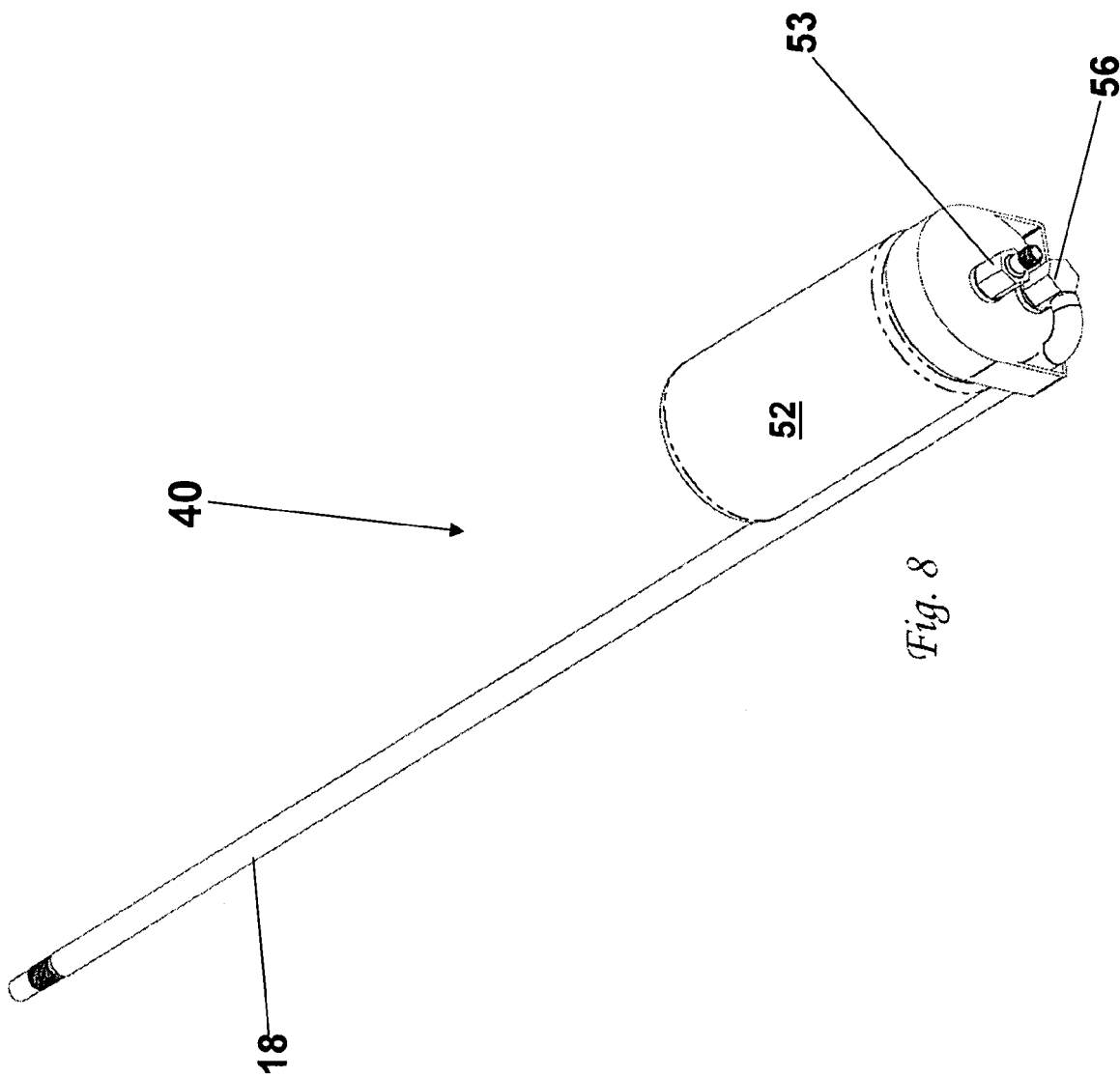
FIGS. 8 and 9 illustrate more details of the sealant container with hose.
Figure 9:
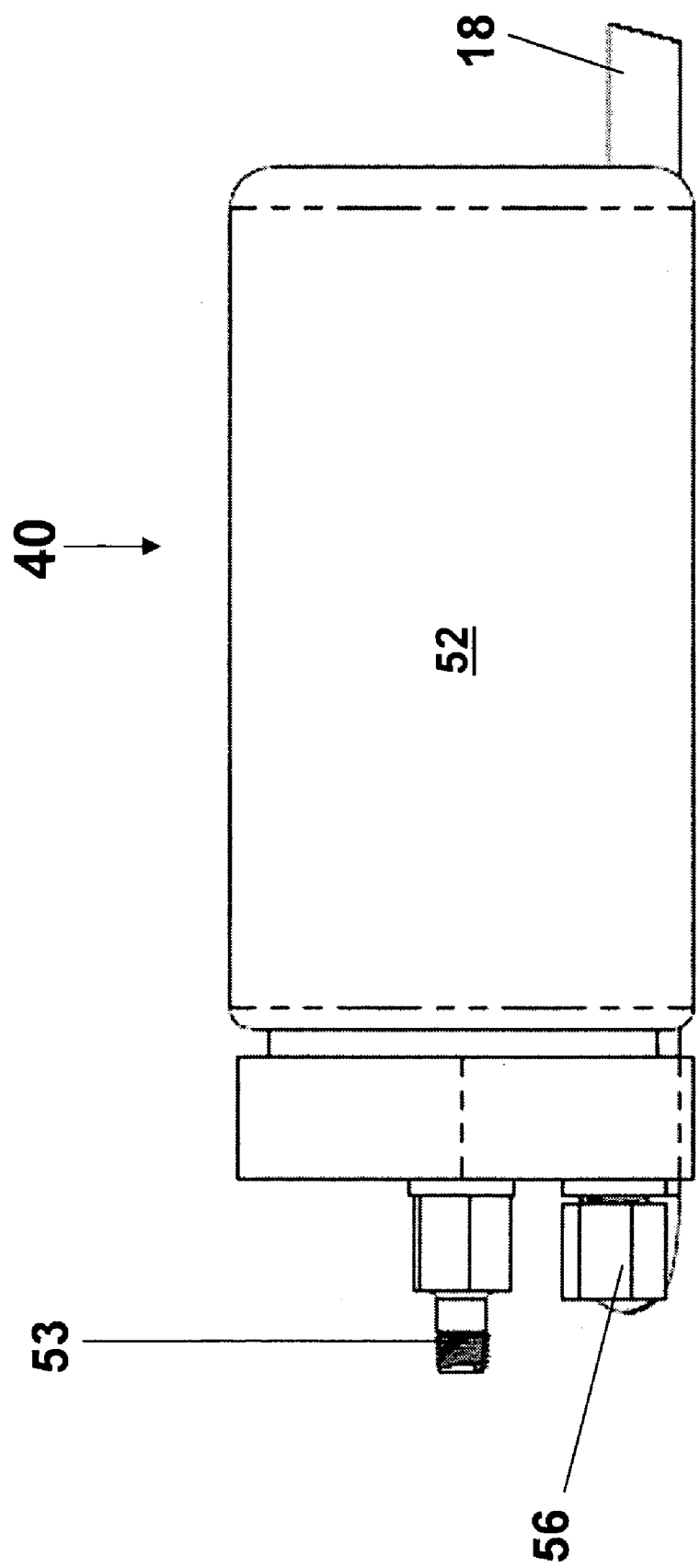

FIG. 7 illustrates a cut-away side view of the integrated compressor device 10 showing the connection of the sealant container to the integrated compressor. In particular, the bottle 52 is connected to the device by the valve/connector 53. The hose 18 is connected to the assembly 50 by a second valve/connector, 56. FIGS. 8 and 9 illustrate more details of the sealant container with the hose 18. In operation, a compressed gas from the compressor, when the sealant container 40 is coupled to the device as shown in FIG. 7, passes through the valve 53 into the bottle 52 and then exits the bottle 52 with the sealant through the hose 18 when the hose is connected to an inflatable object. In this manner, the sealant never comes into contact with the compressor (due to the check valve in the connector 53, shown as a ball check valve in FIG. 7) and does not foul the compressor of the hose 20 used to inflate an inflatable object. In addition, the second valve/connector 56 ensures that, when the sealant and air is not being injected into an inflatable object, the sealant is sealed (by the ball valve) so that the sealant does not harden or leak and become useless.

Figure 10:
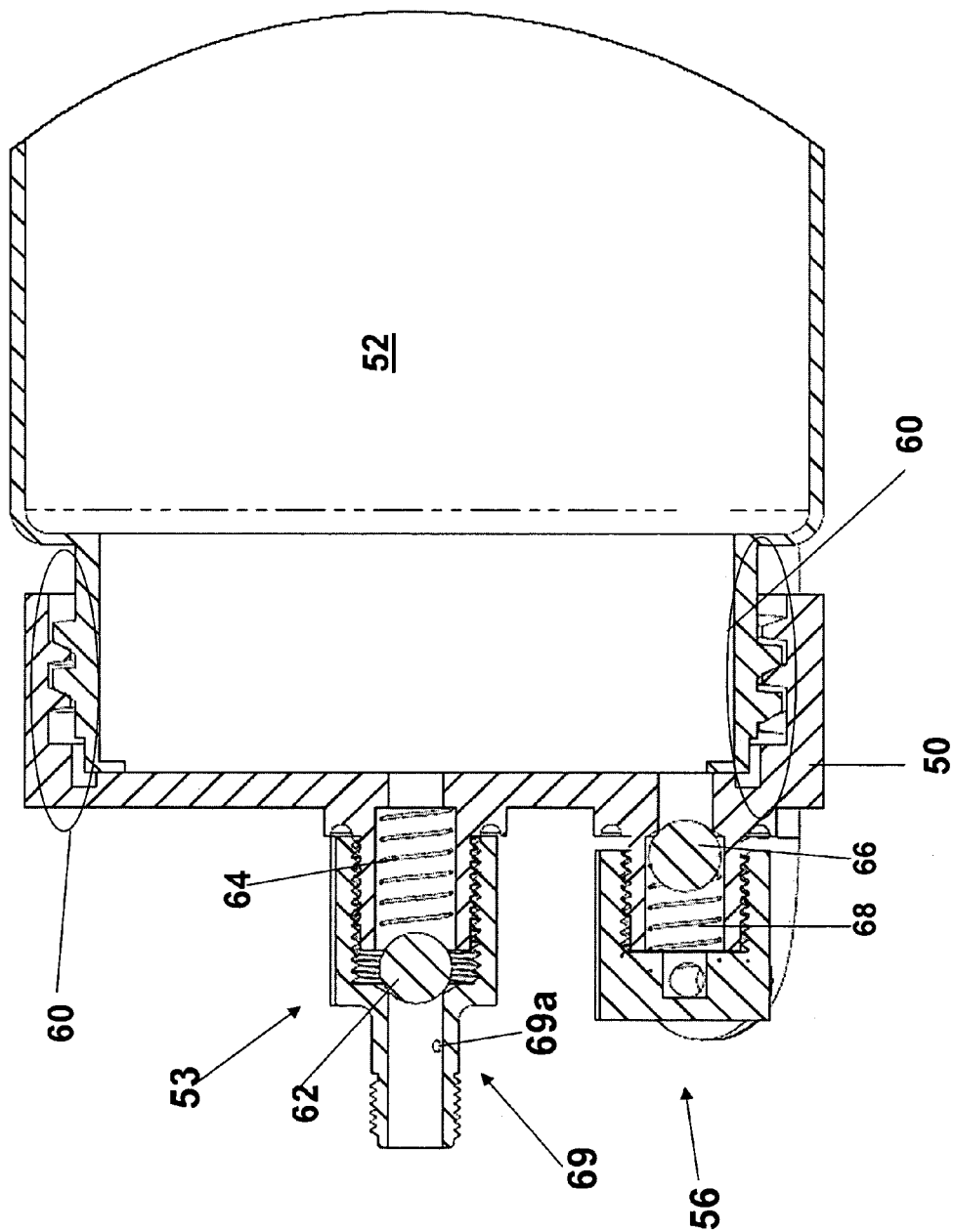
FIG. 10 shows more details of the connector for the sealant container with hose shown in FIGS. 8 and 9.

FIG. 10 shows more details of the connector for the sealant container with hose shown in FIGS. 8 and 9. In the particular, the assembly 50 and its connection with the bottle 52 is shown in which the bottle 52 has the wide mouth. The assembly 50 has a set of threads 60 that cooperate with a set of threads on the bottle to couple the bottle to the assembly. The first connector 53 has a ball check valve that consists of a ball 62 and a spring 64 that biases the ball against a wall of the valve (as shown in FIG. 10) when the compressed gas is not being injected into the bottle. When compressed gas is being injected into the bottle, the compressed gas pushes the ball against the spring so that compressed gas is able to flow into the bottle 52. The second connector 56 also has the check valve with a ball 66 and spring 68 that biases the ball against a wall of the assembly (as shown in FIG. 10) so that the sealant in the sealant bottle 52 is not allowed to leak and is not exposed to air (which hardens the sealant material) unless the sealant and compressed gas are being injected into the inflatable object.

The connector further has a pressure relief valve 69 that regulates the pressure inside of the sealant container so that the device may be used with any compressor that generates any pressure. The pressure relief valve can be implemented in different manners. For example, the pressure relief valve may be a sleeve valve that has a small hole 69a in a wall of the inlet 53 and a rubber sleeve (not shown) that is slipped over the inlet are covers the hole. The hole diameter and sleeve dimensions are chosen so that at a critical pressure air will pass through the hole under the sleeve limiting the maximum pressure inside of the sealant container.

Figure 11:
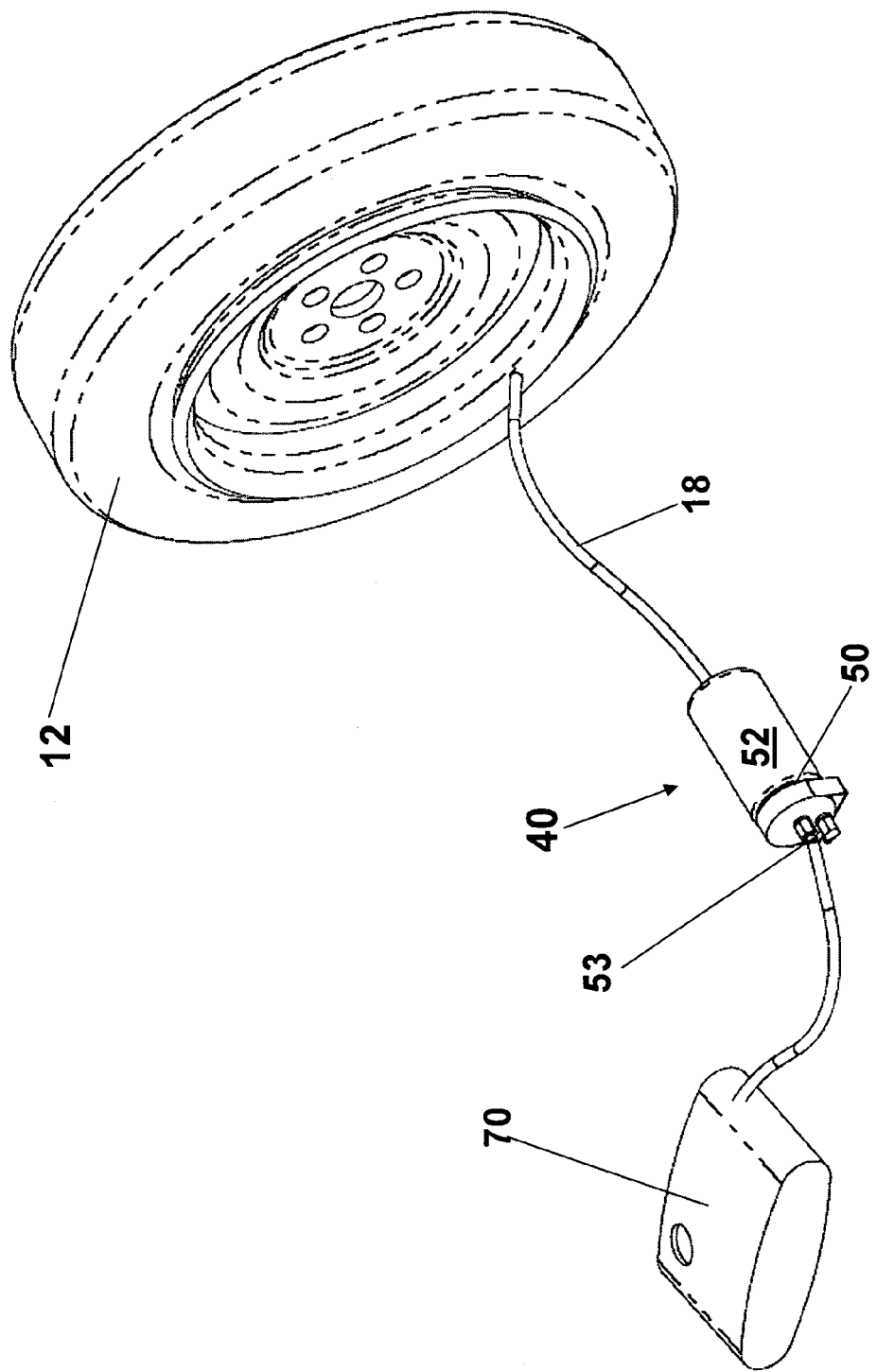
FIG. 11 illustrates an embodiment in which the sealant container is used with a typical compressor.

FIG. 11 illustrates an embodiment in which the sealant container 40 is used with a typical compressor 70. In particular, the sealant container with the sealant bottle 52, assembly 50 and hose 18 can be connected to a typical air compressor 70 using the connector 53 so that the inflatable object 12 may be repaired and inflated using a combination of the sealant container 40 in accordance with the invention and a typical air compressor. In accordance with the invention, this method of operation allows a user to use a typical air compressor to repair a tire without fouling the air compressor with the sealant material due to the valves as described above.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A device for tire repair and/or inflation, comprising:
a compressor unit that has a compressor; and
a connector to a bottle of sealant integrated into the compressor unit so that a bottle of sealant is connectable to the device to inflate a tire, wherein the connector further comprises a first ball valve connector that removably connects the bottle of sealant to the device and ensures that compressed gas flows into the bottle of sealant from the compressor but sealant does not flow out from the bottle of sealant to the air compressor and a second ball valve connector that connects a hose so that sealant and compressed gas are injected into an inflatable object and permits a mixture of compressed gas and sealant to exit the bottle of sealant but does not permit air to enter back into the bottle of sealant from the inflatable object.

2. The device of claim 1, wherein the device further comprises a bottle connector that removably connects a bottle of sealant to the connector to inflate a tire.

3. The device of claim 2, wherein the bottle connector orients the bottle of sealant horizontally.

4. The device of claim 2, wherein the bottle connector further comprises a connector to a hose through which air and sealant is provided to the tire.

5. The device of claim 2, wherein the bottle of sealant further comprises a wide mouth bottle.

6. The device of claim 1, wherein the bottle connector further comprises a pressure relief valve.

7. The device of claim 6, wherein the pressure relief valve further comprises a sleeve valve.

8. The device of claim 1, wherein the compressor unit further comprises a set of controls to control the operation of the compressor.

9. The device of claim 8, wherein the set of controls further comprises a selector switch that selects between one of providing only air to the tire to inflate the tire and providing air and sealant from a bottle of sealant to the tire to repair and inflate the tire.

10. The device of claim 9 further comprises a first hose through which air is provided to the tire and a second hose through which air and sealant is provided to the tire.

11. The device of claim 10, wherein the first and second hoses each further comprises a screw valve that prevents the sealant from dripping when the device is not connected to a tire.

12. The device of claim 9, wherein the set of controls further comprises one or more of an on/off switch and an air pressure gauge.

13. The device of claim 1 wherein the first and second ball valves each further comprise a ball and a spring.

14. A sealant dispenser, comprising:
a bottle connector assembly having a first connector that removable connects a bottle of sealant to the dispenser and a second connector that connects to a hose that can be coupled to an inflatable object;
a stand coupled to the bottle connector assembly that maintains a bottle of sealant in a dispensing position when a bottle of sealant is connected to the dispenser;
an inlet connector that is capable of connecting the sealant container to a gas output from an air compressor; and
wherein the first connector the further comprises a first ball valve connector that removably connects the bottle of sealant to the device and ensures that compressed gas flows into the bottle of sealant from the compressor but sealant does not flow out from the bottle of sealant to the air compressor and wherein the second connector further comprises a second ball valve connector that connects a hose so that sealant and compressed gas are injected into an inflatable object and permits a mixture of compressed gas and sealant to exit the bottle of sealant but does not permit air to enter back into the bottle of sealant from the inflatable object.

15. The container of claim 14, wherein the bottle connector assembly further comprising a pressure relief valve to exhaust too much pressure of the compressed gas so that the sealant container is operable with a variety of air compressors.

16. The container of claim 14, wherein the dispensing position further comprises one of a vertical position and a horizontal position.

17. The container of claim 14, wherein the bottle of sealant is a wide mouth bottle.

* * * * *